(12) United States Patent
Beneker et al.

(10) Patent No.: US 8,016,358 B2
(45) Date of Patent: Sep. 13, 2011

(54) FORWARD TILTABLE MOTOR VEHICLE SEAT

(75) Inventors: Wilfried Beneker, Leichlingen (DE);
Burckhard Becker, Solingen (DE)

(73) Assignee: C. Rob. Hammerstein GmbH & Co., KG (DE)

( * ) Notice: Subject to any disclaimer, the term of this patent is extended or adjusted under 35 U.S.C. 154(b) by 278 days.

(21) Appl. No.: 12/258,540

(22) Filed: Oct. 27, 2008

(65) Prior Publication Data
US 2009/0108659 A1 Apr. 30, 2009

(30) Foreign Application Priority Data
Oct. 26, 2007 (DE) .......................... 10 2007 051 644

(51) Int. Cl.
*B60N 2/20* (2006.01)
(52) U.S. Cl. .............................. 297/378.12; 297/378.14
(58) Field of Classification Search .................. 297/341, 297/367 R, 378.12, 378.14
See application file for complete search history.

(56) References Cited

U.S. PATENT DOCUMENTS

| 5,052,748 | A | * | 10/1991 | Fourrey et al. | 297/124 |
| 5,482,349 | A | * | 1/1996 | Richter et al. | 297/15 |
| 6,139,104 | A | * | 10/2000 | Brewer | 297/353 |
| 6,447,066 | B1 | * | 9/2002 | Chabanne et al. | 297/367 R |
| 6,464,299 | B1 | * | 10/2002 | Castagna | 297/378.12 |
| 6,513,875 | B1 | * | 2/2003 | Gray et al. | 297/378.14 |
| 6,513,876 | B1 | * | 2/2003 | Agler et al. | 297/378.14 |
| 7,025,422 | B2 | * | 4/2006 | Fast | 297/378.14 |
| 7,374,244 | B2 | * | 5/2008 | Becker et al. | 297/341 |
| 2002/0050733 | A1 | * | 5/2002 | Hansel et al. | 297/367 |

* cited by examiner

*Primary Examiner* — Peter R. Brown
(74) *Attorney, Agent, or Firm* — Cantor Colburn LLP

(57) ABSTRACT

A forward tiltable motor vehicle seat has a seat carrier and a seat back, a hinge mounting is associated with the seat back and comprises an upper hinge arm connected to the seat back and a lower hinge arm hinged about a forward tilt axis to the seat carrier. The seat carrier forms a clamping flank. A cam is provided and is movable between a stop position and a release position. The cam is disposed on the lower hinge arm and rests against the clamping flank in the stop position.

11 Claims, 4 Drawing Sheets

FORWARD TILTABLE MOTOR VEHICLE SEAT

Figure 1:
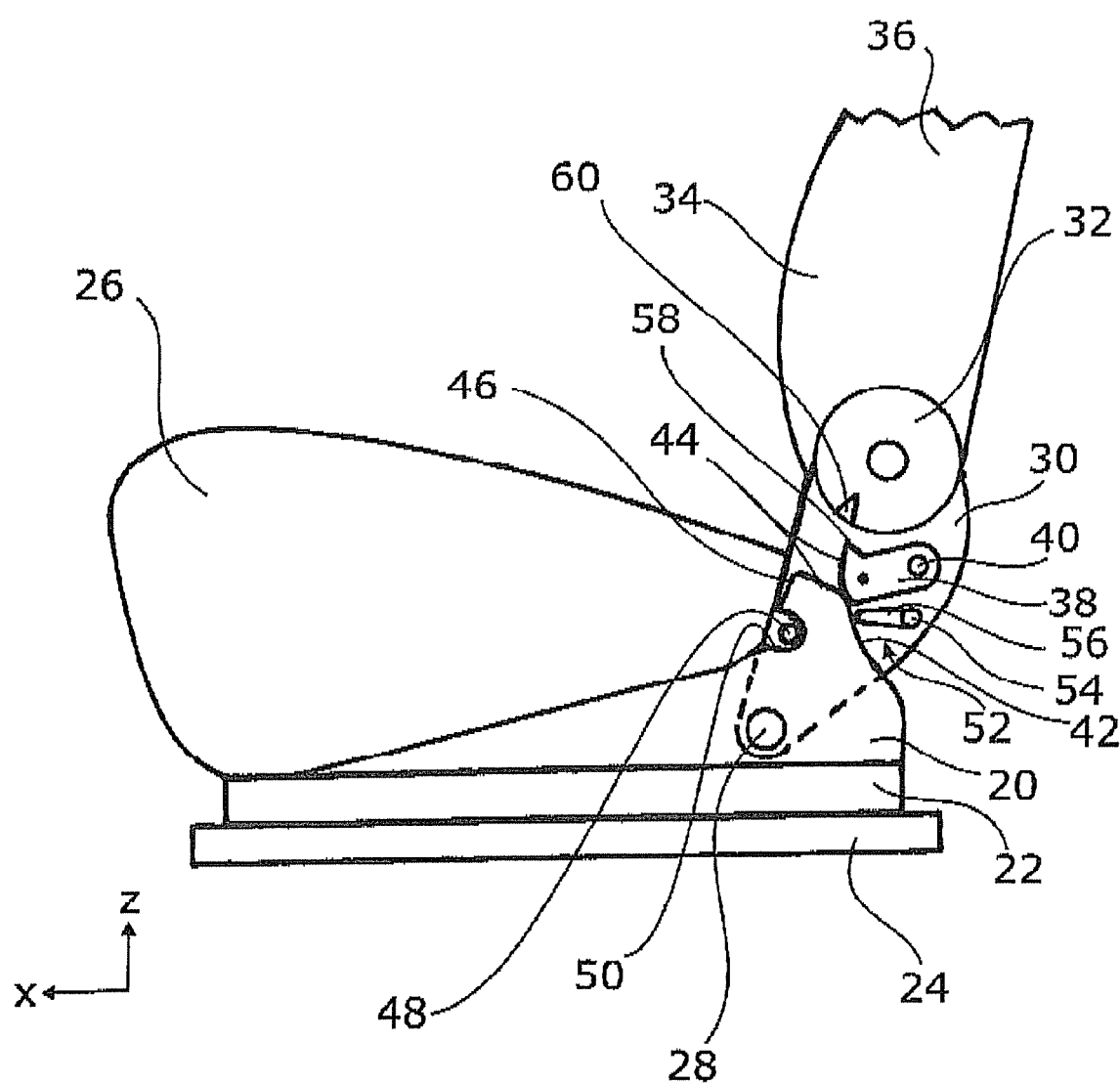

The invention relates to a forward tiltable motor vehicle seat with a seat carrier and with a seat back, a hinge mounting being associated with said seat back, said hinge mounting comprising an upper hinge arm connected to said seat back and a lower hinge arm hinged about a forward tilt axis to said seat carrier, said seat carrier forming a clamping flank, a cam which is movable between a stop position and a release position is disposed on the lower hinge arm, the cam lies on the clamping flank in the stop position.

A such type motor vehicle seat has been known from DE 10 2006 028 899 A1. In particular for motor vehicles having only one door on each vehicle side and also having rear seats, motor vehicle seats that can be readily displaced forward are needed for ease of access to the rear seats. The prior art motor vehicle seat can be tilted forward about the forward tilt axis; the seat back can be actuated quickly. The incline of the seat back is adjusted by the hinge mounting within a range of adjustment. In all there are thus provided two pivot axes for the seat back.

The cam blocks the forward movement of the seat back. It ensures zero clearance of this blocking; accordingly, its stop position is not exactly dictated but rather adapts to the respective circumstances, and also to wear. A stop, which limits the backward movement of the seat back, is further provided on the lower hinge arm.

The problem of this construction is that the cam is not held in its release position but falls downward. This may lead to function failure later, when the seat back is moved back to its upright position.

This is where the invention comes in. It is directed to stabilize the cam and to thus make the movements more secure. It is therefore the object of the invention to develop the forward tiltable motor vehicle seat of the type mentioned herein above in such a manner that the cam is stable in its release position and can be utilized in particular for other functions.

In view of the forward tiltable motor vehicle seat having the features of the type mentioned herein above, this object is solved in that there is provided a cam holder that fits beside the cam and supports it toward the bottom when said cam is released.

The function of the cam holder is to stabilize the cam in the release position, in particular to hold it outside of the range of movement of the seat carrier. In the stop position with self-locking, the cam rests against the clamping flank of the seat carrier. By contrast, for the cam holder, the angles and other correlations are chosen for a self-locking not to occur. If, during a forward tilting movement, the cam holder comes into contact with the seat carrier, this movement is not blocked by the cam holder; instead, the cam holder is pushed out of the way. Accordingly, the cam holder is movable. In another embodiment, the cam holder is a leaf spring.

The cam holder clearly dictates the position of the cam in the release position. In the stop position, the cam holder has no function, it is more specifically preferred that it does not rest against the cam in order not to influence the stop position.

In a preferred further development of the invention, the cam holder can be utilized to give the cam an additional function. For this purpose, it is proposed that the cam has a detent projection and that the hinge mounting has a detent bight conforming to the detent projection. In the release position, the detent projection engages the detent bight. Kinematic reversal is possible. This engagement can be maintained by the cam holder, preferably through an elastic bias. The cam holder is preferably configured to be elastic.

It is preferred that the cam holder has a pin that is located outside the range of movement of the seat carrier. The cam holder preferably has a resilient element that is for example configured to be a spring or a pivotal arm and that rests against the cam in the release position. It preferably abuts the cam from the bottom.

The invention is in particular suited for forward tiltable motor vehicle seats with manual Easy Entry.

Figure 2:
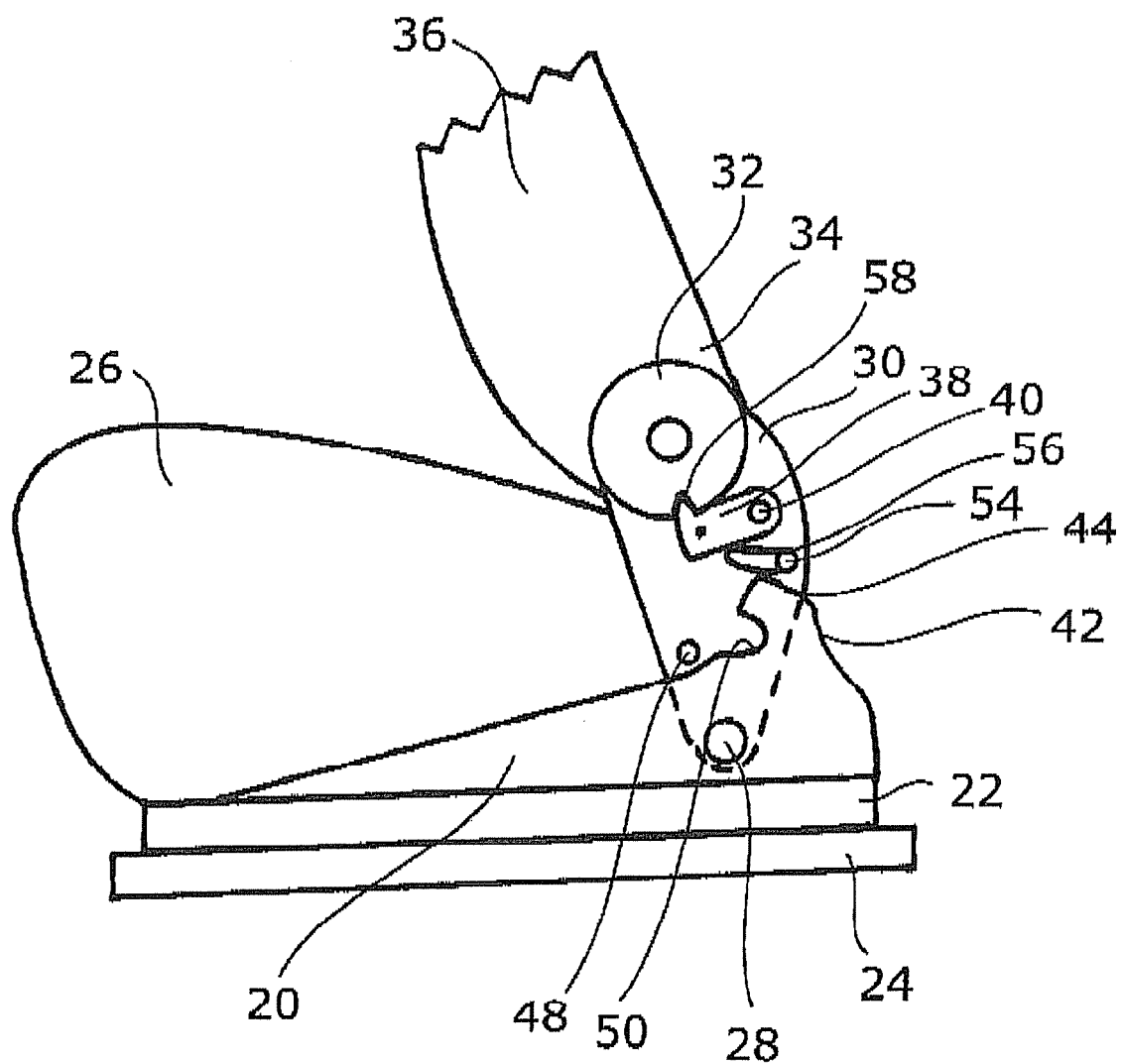
Figure 3:
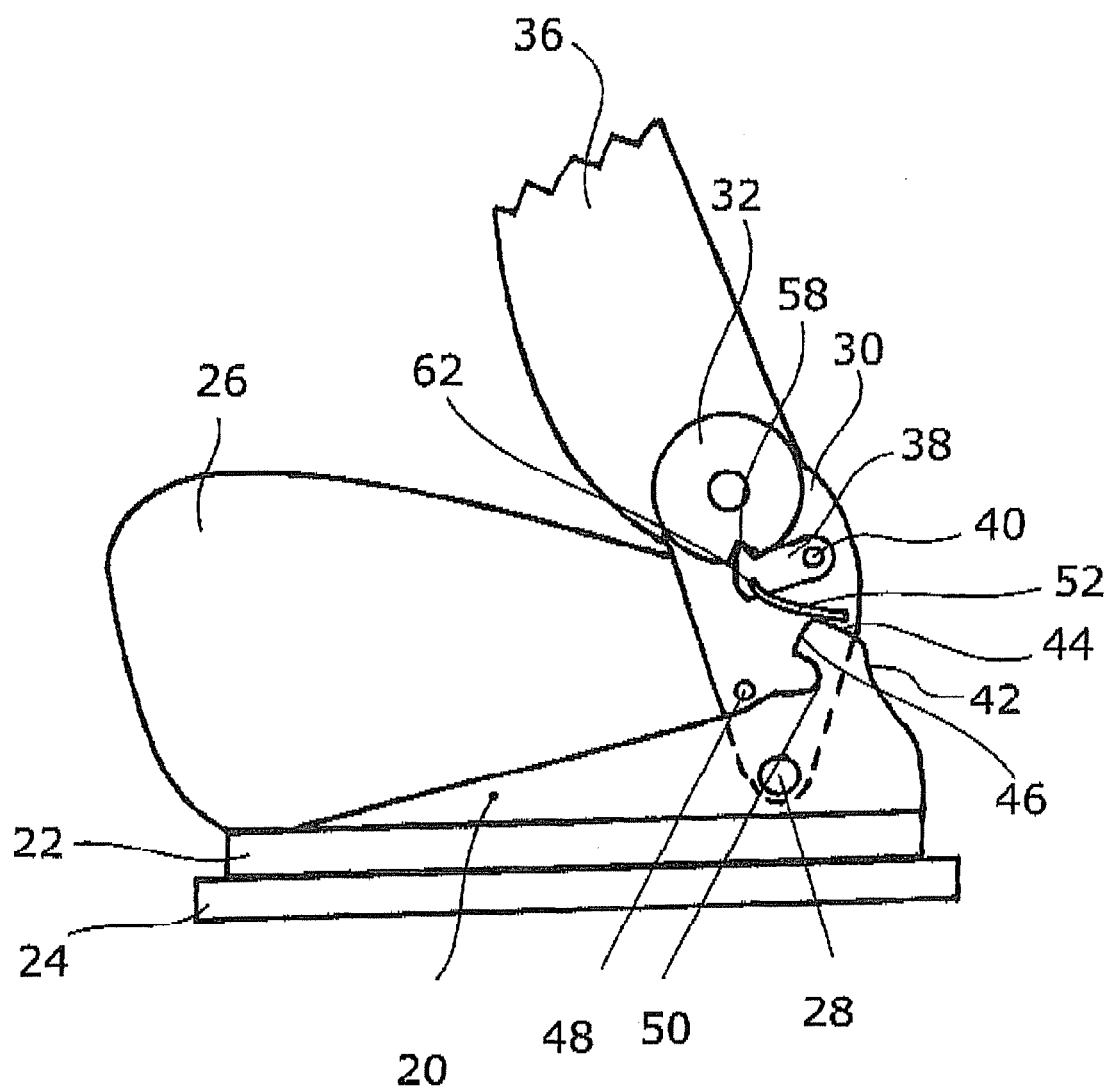
Figure 4:
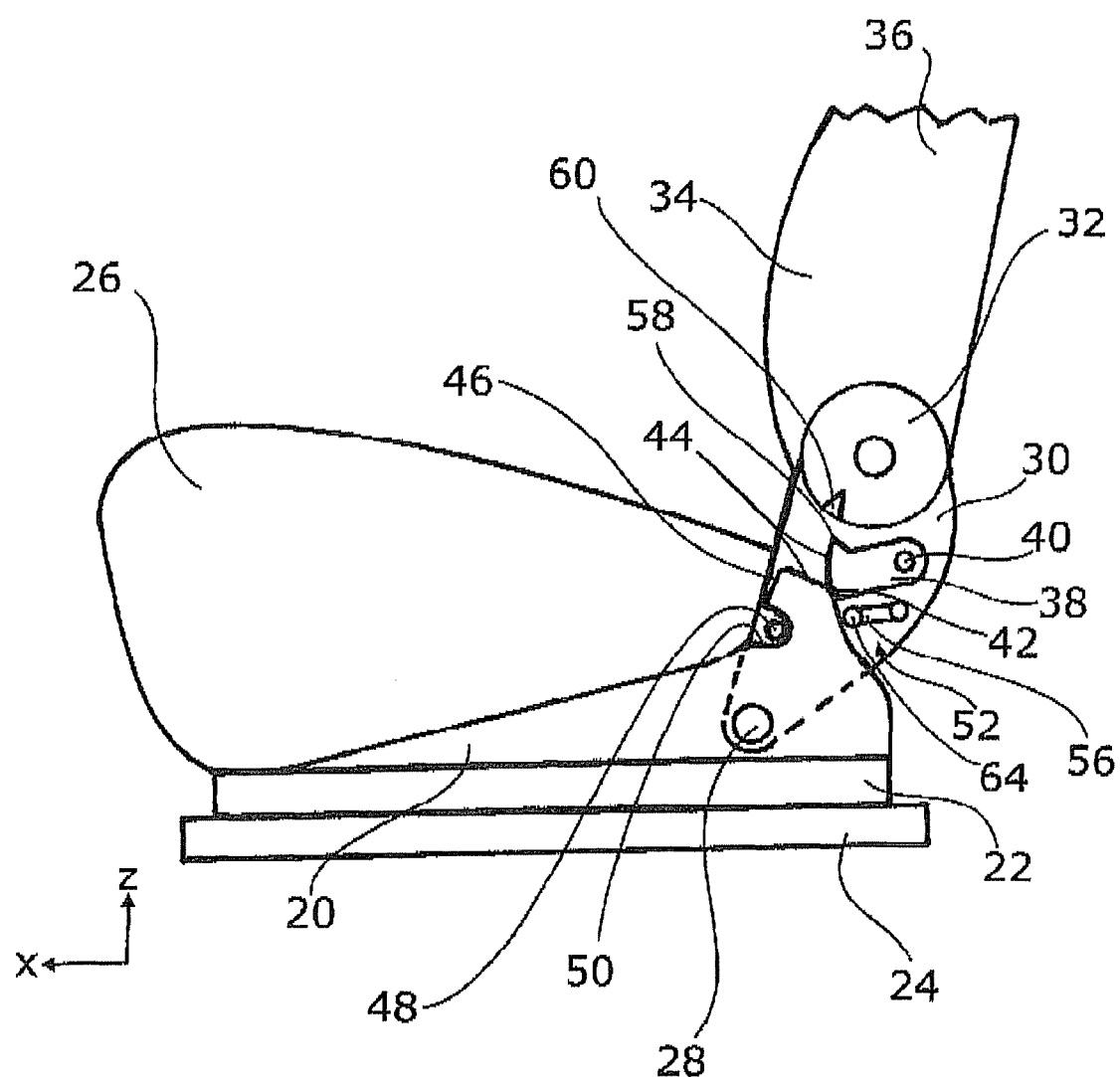

Other features and advantages of the invention will become more apparent upon reviewing the appended claims and the following non restrictive description of embodiments of the invention, given by way of example only with reference to the drawing. In said drawing:

FIG. 1: shows a schematic side view of a motor vehicle seat,

FIG. 2: shows a view according to FIG. 1, the seat back now being in the forward tilted position; it is tilted forward about the forward tilt axis, FIG. 3: shows a view like FIG. 2, but for a second exemplary embodiment, the cam holder is now formed by a leaf spring and FIG. 4: is a view according to FIG. 1, but for a third exemplary embodiment, the cam holder now has a roll on its front side.

Only the essential elements of an actually known motor vehicle seat are illustrated in the Figs. They show a seat carrier 20 that is carried by an underframe. The underframe is illustrated by a pair of rails having a top rail 22 and a bottom rail 24. The bottom rail 24 is intended to be fastened to an underbody (not shown) of a motor vehicle.

The seat carrier 20 carries a seat part 26. On the seat carrier 20 there is further formed a forward tilt axis 28 to which a lower hinge arm 30 of a hinge mounting 32 is hinge-linked. The hinge mounting 32 further has an upper hinge arm 34 that is solidly connected to a seat back 36. The incline of the seat back 36 can be adjusted about the axis of the hinge mounting 32 within a range of adjustment.

At the lower hinge arm 30, a cam 38 is hinge-linked to a cam axis 40. It cooperates with a clamping flank 42 that is formed on the seat carrier 20. Toward the top, it merges into an upper flank 44 that delimits the seat carrier toward the top, it is adjoined with a front flank 46 toward the front, in the x direction. These flanks 42 through 46 define an upward protruding projection (in the z direction) of the seat carrier 20.

The cam axis 40 is located outside of the range of movement of this projection, in FIG. 1, the cam 38 is in the stop position, it has a rounded cam flank which rests against the clamping flank 42. As a result, the lower hinge arm 30 is blocked toward the front and is thus prevented from tilting forward about the forward tilt axis 28. The movement in the opposite direction of pivotal movement is blocked by cooperation of a limit stop 48 disposed on the lower hinge arm 30 and a limit stop flank 50, which is part of the front flank 46.

An actuation mechanism that has not been illustrated herein is associated with the cam 38; it is configured according to prior art. It makes it possible to pull the cam free from the stop position shown into the release position shown in FIG. 2. An elastic means is further preferably associated with the cam 38, said elastic means biasing said cam anti-clockwise, thus maintaining the clamping position shown in FIG. 1.

If the cam 38 in pivoted from the position shown in FIG. 1 into its release position, it is located outside of the range of movement of the projection 42 through 46. The lower hinge arm 30 can now be pivoted forward about the forward tilt axis 28 into the position shown in FIG. 2. The angular position of the seat back 36 depends on the adjustment of the hinge mounting 32.

The explanations given herein above apply to all three exemplary embodiments. Herein after, the first exemplary embodiment shown in the FIGS. 1 and 2 will be discussed in closer detail:

A cam holder 52 is associated with the cam 38. It is located underneath the cam 38. The cam holder 52 comprises a pin 54 that is located outside of the range of movement of the projection 42 through 46 and is disposed on the lower hinge arm 30. It is connected to a resilient element 56 that is configured for example to be an arm that is pivotal about the pin 51 or as a spring body, such as a leaf spring. This movable element is located in the range of movement of the projection. In the position shown in FIG. 1, a free end thereof rests against the clamping flank 42, this occurs underneath the cam 38 and without contact with the cam 38. The abutment on the clamping flank 42 is outside the range of self-locking. During a forward tilt from the position shown in FIG. 1 into the position shown in FIG. 2, the free end of the element 56 glides along the clamping flank 42 and via the top flank 42 into the position shown in FIG. 2. During this movement, the free end contacts an underside of the cam 38 and remains in contact so that the cam holder 52 supports the cam 38 as shown in FIG. 2. As a result, the cam 38 cannot fall downward, meaning it cannot come to bear against the front flank 46.

A detent projection 58 is formed on the cam 38; it is located at an upper flank. A detent bight 60 in the hinge mounting 32 is associated therewith. Said detent bight is connected to the upper hinge arm 34; it moves together therewith relative to the lower hinge arm 30. As shown in FIG. 2, the detent projection 58 engages the detent bight 60 in the forward tilted position. The hinge mounting 32 is only stopped at the other seat side, on the seat side shown, which is equipped with the cam 38, the hinge mounting is passive. In a known way, the seat side shown is retained by a cross tie or a shaft, the angular position is thereby fixed on the other seat side by the hinge mounting 32. This shaft can twist. Accordingly, the seat side that is not directly stopped is mechanically softer than the other seat side. This may cause problems. If there is a passenger or more specifically a cargo to be transported behind the motor vehicle seat considered, and if the seat has the position shown in FIG. 2, it is possible that the stop by the unilateral hinge mounting 32 will not suffice. According to the developed embodiment, the not directly stopped seat side is also stopped by cooperation of the detent projection 58 and the detent bight 60 so that there is also a high stopping force and as a result thereof high safety on this seat side. More specifically, an elastically configured cam holder 52 serves to allow the detent projection 58 and the detent bight 60 to engage on the one side and to maintain this engagement on the other side.

The second exemplary embodiment shown in FIG. 3 differs from the first exemplary embodiment by the fact that the cam holder 52 is now connected to the cam 38. In the cam 38 there is formed a slot 62 that is located opposite the do tent projection 58 and that extends at an angle. A leaf spring forming the cam holder 52 is fastened therein. Like in all the exemplary embodiments, the flanks, in particular the clamping flank 42 and the upper flank 44, extend continuously and are as far as practicable rounded for the cam holder 52 to be capable of travelling along these flanks.

In the third exemplary embodiment shown in FIG. 4, a roll 64 is mounted on the free end of the cam holder 52. For the rest, the cam holder 52 is similar to the first exemplary embodiment. Like in the first exemplary embodiment, the roll 64 senses the course of the flanks 42 and 44. The position of the cam holder 52 is controlled as a result thereof. Insofar, the flanks 42 and 44 form control flanks for the cam holder 52. The roll 64 preferably always remains in contact with these flanks 42, 44. It appears that there is no self-locking, the cam holder 52 can move along the flanks 42, 44.

The invention claimed is:

1. A forward tiltable motor vehicle seat comprising a seat carrier, a hinge mounting and a seat back, said hinge mounting being arranged between said seat carrier and said seat back, said hinge mounting comprising an axis of the hinge mounting, an upper hinge arm and a lower hinge arm, said upper hinge arm can be adjusted with respect to the lower hinge arm about said axis of the hinge mounting, said upper hinge arm is connected to said seat back and said lower hinge arm is hinged about a forward tilt axis to said seat carrier; said seat carrier forming a clamping flank, a cam being disposed on said lower hinge arm and is movable between a stop position, wherein said cam engages said clamping flank and a hinge motion of said lower hinge arm about said forward tilt axis is blocked, and a release position wherein said cam does not engage said clamping flank and said lower hinge arm can be tilted about said forward tilt axis; wherein said cam has a rounded clamping flank, and a cam holder is provided on one of said cam and said lower hinge arm, said cam holder fits beside said cam and supports said cam against a downward movement by engaging a bottom surface of said cam when said cam is in said release position.

2. The forward tiltable motor vehicle seat as set forth in claim 1, wherein said seat carrier comprises an upper flank, said upper flank bordering said clamping flank in the direction of a tilting movement of said lower hinge arm about said forward tilt axis towards a forward tilted position of said seat back and in said release position said cam holder is in contact with said upper flank.

3. The forward tiltable motor vehicle seat as set forth in claim 1, wherein said cam comprises a detent projection formed thereon and, said hinge mounting comprises at least one detent bight configured to receive said detent projection wherein said seat back is in said forward tilted position.

4. The forward tiltable motor vehicle seat as set forth in claim 3, wherein said seat has a first seat side on which is located said cam, and a second seat side, said hinge mounting has no catch on said first seat side.

5. The forward tiltable motor vehicle seat as set forth in claim 1, wherein said clamping flank is adjacent an upper flank, said clamping flank and said upper flank forming a continuous radial surface configured to be engaged by said cam holder when said cam moves between said stop position and said release position.

6. The forward tiltable motor vehicle seat as set forth in claim 1, wherein said cam holder is armed by a leaf spring, said leaf spring is connected with said cam and in said release position rests against one of said flanks.

7. The forward tiltable motor vehicle seat as set forth in claim 1, wherein said cam holder comprises a pin configured to attach a resilient element to said lower hinge arm, said resilient element being configured to pivot about said pin as said cam holder rotates towards and away from said cam, wherein said resilient element is one of an elastic part and a mechanically movable part.

8. A forward tiltable motor vehicle seat comprising a seat carrier, a hinge mounting and a seat back, said hinge mounting being arranged between said seat carrier and said seat back, said hinge mounting comprising an axis of the hinge mounting, an upper hinge arm and a lower hinge arm, said upper hinge arm can be adjusted to the lower hinge arm about said axis of the hinge mounting said us ser hinge arm is connected to said seat back and said lower hinge arm is hinged about a forward tilt axis to said seat carrier; said seat carrier forming a clamping flank, a cam being disposed on said lower hinge arm and is movable between a stop position, wherein said seat back is stationary and said cam engages said clamping flank and a hinge motion of said lower hinge arm about said forward tilt axis is blocked, and a release position wherein said cam does not engage said clamping flank and said lower hinge arm can be titled about said forward tilt axis; wherein a cam holder is provided on one of said cam and said lower hinge arm, fits beside said cam and supports said cam against a downward movement by engaging a bottom surface of said cam when said cam is in said release position and wherein said cam holder is located underneath said cam.

9. The forward tiltable motor vehicle seat as set forth in claim 8, wherein said cam holder is disposed on said lower hinge arm.

10. The forward tiltable motor vehicle seat as set forth in claim 8, wherein said cam holder comprises a pin configured to attach a resilient element to said lower hinge arm, said resilient element being cg to pivot about said pin as said cam holder rotates towards and away from said cam.

11. The forward tiltable motor vehicle seat as set forth in claim 10, wherein said pin is arranged a first distance from the forward tilt axis and a second distance from the clamping flank, wherein the first distance is more than the second distance, and said pin is disposed outside of said clamping flank in all possible positions of tilt of the lower hinge arm about the forward tilt axis.

* * * * *